US009042915B1

(12) United States Patent
Allegra et al.

(10) Patent No.: US 9,042,915 B1
(45) Date of Patent: May 26, 2015

(54) ESTIMATING THE LOCATION OF A WIRELESS TERMINAL DESPITE APPARENTLY REASONABLE BUT MISLEADING OR ERRONEOUS EMPIRICAL DATA

(71) Applicant: Polaris Wireless, Inc., Mountain View, CA (US)

(72) Inventors: Manlio Allegra, Los Altos Hills, CA (US); David S. De Lorenzo, Palo Alto, CA (US); Jasvinder Singh, Sunnyvale, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

(21) Appl. No.: 14/499,921

(22) Filed: Sep. 29, 2014

Related U.S. Application Data

(63) Continuation of application No. 14/153,437, filed on Jan. 13, 2014, now Pat. No. 8,903,429, which is a continuation of application No. 13/532,140, filed on Jun. 25, 2012, now Pat. No. 8,630,665.

(51) Int. Cl.
*H04W 24/00* (2009.01)
*H04W 4/02* (2009.01)
*G01S 5/02* (2010.01)

(52) U.S. Cl.
CPC ............ *H04W 4/023* (2013.01); *G01S 5/0278* (2013.01)

(58) Field of Classification Search
CPC ........ H04W 4/028; H04W 4/02; H04W 64/00

USPC ........................................... 455/456.1–456.6
See application file for complete search history.

(56) References Cited

U.S. PATENT DOCUMENTS

| | | | | |
|---|---|---|---|---|
| 6,236,365 | B1 * | 5/2001 | LeBlanc et al. | 342/457 |
| 8,582,698 | B2 * | 11/2013 | Andgart et al. | 375/342 |
| 8,824,325 | B2 * | 9/2014 | Zhang et al. | 370/252 |
| 2002/0115448 | A1 * | 8/2002 | Amerga et al. | 455/456 |
| 2003/0146871 | A1 * | 8/2003 | Karr et al. | 342/457 |
| 2004/0152471 | A1 * | 8/2004 | MacDonald et al. | 455/456.1 |
| 2005/0037776 | A1 * | 2/2005 | Perez-Breva et al. | 455/456.1 |
| 2007/0129085 | A1 * | 6/2007 | Kennedy Jr. | 455/456.2 |
| 2008/0113672 | A1 * | 5/2008 | Karr et al. | 455/456.1 |
| 2008/0133126 | A1 * | 6/2008 | Dupray | 701/204 |
| 2010/0303047 | A1 * | 12/2010 | Ibrahim et al. | 370/338 |
| 2013/0143588 | A1 * | 6/2013 | Flanagan et al. | 455/456.1 |

* cited by examiner

*Primary Examiner* — Nathan Mitchell
(74) *Attorney, Agent, or Firm* — Kaplan Breyer Schwarz & Ottesen, LLP.

(57) ABSTRACT

A location engine is disclosed that estimates the location of a wireless terminal using (i) cell ID, (ii) triangulation, (iii) GPS, (iv) RF pattern-matching, or (v) any combination of them. The location engine is adept at discounting the contribution of apparently reasonable but erroneous data. The location engine receives data that are evidence of the location of a wireless terminal at each of a plurality of different times. The location engine then generates an initial hypothesis for the location of the wireless terminal at each time assuming that all of the data is correct and equally probative. Next, the location engine generates one alternative hypothesis for each initial hypothesis and each datum assuming that the datum is erroneous. Finally, the location engine generates the estimate for the location of the wireless terminal at each time by determining which combination of initial hypotheses and alternative hypothesis is the most self-consistent.

42 Claims, 10 Drawing Sheets

ESTIMATING THE LOCATION OF A WIRELESS TERMINAL DESPITE APPARENTLY REASONABLE BUT MISLEADING OR ERRONEOUS EMPIRICAL DATA

CROSS-REFERENCE TO RELATED APPLICATION(S)

This application is a continuation of U.S. patent application Ser. No. 14/153,437, filed Jan. 13, 2014, which is incorporated herein by reference.

FIELD OF THE INVENTION

The invention relates to radio navigation in general, and, more particularly, to generating an accurate estimate of the location of a wireless terminal despite apparently reasonable but misleading or erroneous data.

BACKGROUND

FIG. 1 depicts a diagram of the salient components of wireless telecommunications system 100 in accordance with the prior art. Wireless telecommunications system 100 comprises: wireless terminal 101, cellular base stations 102-1, 102-2, and 102-3, Wi-Fi base stations 103-1 and 103-2, wireless switching center 111, assistance server 112, location client 113, and Global Positioning System ("GPS") constellation 121. Wireless telecommunications system 100 provides wireless telecommunications service to all of geographic region 120, in well-known fashion.

The salient advantage of wireless telecommunications over wireline telecommunications is the mobility that is afforded to the user of the wireless terminal. On the other hand, the salient disadvantage of wireless telecommunications lies in that fact that because the wireless terminal is mobile, an interested party might not be able to readily ascertain the location of the wireless terminal.

Such interested parties might include both the user of the wireless terminal and remote parties. There are a variety of reasons why the user of a wireless terminal might be interested in knowing his or her location. For example, the user might be interested in telling a remote party where he or she is or the user might seek advice in navigation.

In addition, there are a variety of reasons why a remote party might be interested in knowing the location of the user. For example, the recipient of an 9-1-1 emergency call from a user might be interested in knowing the location of the wireless terminal so that emergency services vehicles can be dispatched to the user.

There are many techniques in the prior art for estimating the location of a wireless terminal. The common theme to these techniques is that location of the wireless terminal is estimated based on the electromagnetic (e.g., radio, etc.) signals—in one form or another—that are processed (i.e., transmitted or received) by the wireless terminal.

In accordance with one family of techniques, the location of a wireless terminal is estimated based on the transmission range of the base stations with which it is communicating. Because the range of a base station is known to be N meters, this family of techniques provides an estimate for the location that is generally accurate to within N meters. A common name for this family of techniques is "cell identification" or "cell ID."

There are numerous tricks that can be made to the basic cell ID technique to improve the accuracy of the estimate for the location, and numerous companies like Ericsson, Qualcomm, and Google each tout their own flavor. The principal disadvantage of the family of cell ID techniques is that there are many applications for which the accuracy of the estimate for the location it generates is insufficient.

In accordance with a second family of techniques, the location of a wireless terminal is estimated by analyzing the angle of arrival or time of arrival of the signals transmitted by the wireless terminal. A common, if somewhat inaccurate, name for this family of techniques is called "triangulation."

There are numerous tricks that can be made to the basic triangulation technique to improve the accuracy of the estimate for the location, and numerous companies like TruePosition each tout their own flavor. The principal disadvantage of the triangulation techniques is that there are many applications for which the accuracy of the estimate for the location it generates is insufficient.

In accordance with a third family of techniques, the location of a wireless terminal is estimated by a receiver in the wireless terminal that receives signals from satellites in orbit. A common name for this family of techniques is "GPS."

There are numerous tricks that can be made to the basic GPS technique to improve the accuracy of the estimate for the location, and numerous companies like Qualcomm each tout their own flavor. The principal advantage of the GPS techniques is that when it works, the estimate for the location can be accurate to within meters. The GPS techniques are disadvantageous in that they do not work consistently well indoors, in heavily-wooded forests, or in urban canyons.

In accordance with a fourth family of techniques, the location of a wireless terminal is estimated by pattern matching one or more location-dependent traits of one or more electromagnetic signals that are processed (i.e., transmitted and/or received) by the wireless terminal. Common names for this family of techniques include "Wireless Location Signatures," "RF Pattern Matching," and "RF Fingerprinting."

The basic idea is that some traits of an electromagnetic signal remain (more or less) constant as a signal travels from a transmitter to a receiver (e.g., frequency, etc.) and some traits change (e.g., signal strength, relative multi-path component magnitude, propagation delay, etc.). A trait that changes is considered a "location-dependent" trait. Each location can be described or associated with a profile of one or more location-dependent traits of one or more electromagnetic signals. A wireless terminal at an unknown location can observe the traits and then attempt to ascertain its location by comparing the observed traits with a database that correlates locations with expected or predicted traits.

There are numerous tricks that can be made to the basic Wireless Location Signatures technique to improve the accuracy of the estimate for the location, and numerous companies like Polaris Wireless each tout their own flavor. The principal advantage of the Wireless Location Signatures technique is that it is highly accurate and works well indoors, in heavily-wooded forests, and in urban canyons.

All of these techniques rely on empirical data as their basis, and the accuracy of these techniques suffer when some or all of the data is misleading or erroneous. Typically, it is easy to identify and disregard data that is clearly unreasonable. For example, if one datum indicates that a wireless terminal is inside of the Sun, that datum is clearly erroneous and can be disregarded. In some cases a reasonable estimate for the location of the wireless terminal can be generated with the remaining data, and sometimes it cannot.

In contrast, it is difficult to identify data that is apparently reasonable, but misleading or erroneous. For example, if one datum in a set of data suggests a wireless terminal is on a lake near a highway, the datum appears reasonable, but it might or might not be erroneous. For example, the datum might be entirely correct because the wireless terminal is on a boat on the lake. Alternatively, the datum might be erroneous because the wireless terminal is in a car on the highway next to the lake. In either case, it is not easy to know whether using that datum is improving or degrading the overall accuracy of the estimate.

Unfortunately, apparently reasonable, but erroneous or misleading empirical data is commonly used as the basis for estimating the location of a wireless terminal, and, therefore, a technique is needed that ameliorates or eliminates the effect of such data.

SUMMARY OF THE INVENTION

The present invention enables an estimate of the location of a wireless terminal to be generated without some of the costs and disadvantages of techniques for doing so in the prior art. For example, some embodiments of the present invention are adept at discounting the contribution of apparently reasonable but erroneous or misleading data.

For example, the illustrative embodiment of the present invention receives data that is evidence of the location of a wireless terminal at each of a plurality of different times. The illustrative embodiment then generates an initial hypothesis for the location of the wireless terminal at each time assuming that all of the data is correct and equally probative. Next, the illustrative embodiment generates an alternative hypotheses for each initial hypothesis on the assumption that each proper subset of datum is erroneous. This is accomplished by underweighting or discarding each datum in the proper subset.

For example, if the set of data for time t(1) is {A, B, C}, then the initial hypothesis for time t(1) is based on an equal weighting of A, B, and C. Because the set comprises three datum, there are six non-empty subsets of datum: {A}, {B}, {C}, {A, B}, {A, C}, and {B, C}. Each alternative hypothesis for time t(1) can be generated by using the data in each of the non-empty subsets and by underweighting or discarding the data not included in the subset.

These alternative hypothesis can be "snapped" or moved to a nearby road or transportation path, or they can be left alone.

Finally, the illustrative embodiment generates the estimate for the location of the wireless terminal at each time in a time frame by determining which combination of initial hypotheses and alternative hypothesis is the most self-consistent during the entire time frame.

The illustrative embodiment comprises:
receiving, at a location engine, a first signal value whose value is evidence of the location of the wireless terminal at time t(1);
receiving, at the location engine, a second signal value whose value is evidence of the location of the wireless terminal at time t(1);
receiving, at the location engine, a third signal value whose value is evidence of the location of the wireless terminal at time t(2);
generating, at the location engine, a first hypothesis for the location for the wireless terminal at time t(1) based on the first signal value having first weight and the second signal value having second weight, wherein the first weight is greater than the second weight;
generating, at the location engine, a second hypothesis for the location for the wireless terminal at time t(1) based on the first signal value having third weight and the second signal value having fourth weight, wherein the third weight is less than the fourth weight;
generating, at the location engine, a first hypothesis for the location for the wireless terminal at time t(2) based on the third signal value; and
generating, at the location engine, an estimate for the location of the wireless terminal at time t(2) based on:
the first hypothesis for the location for the wireless terminal at time t(1),
the second hypothesis for the location for the wireless terminal at time t(1), and
the first hypothesis for the location for the wireless terminal at time t(2); and
transmitting, from the location engine, the estimate for the location of the wireless terminal at time t(2) for use by a location-based application;
wherein the first weight, the second weight, the third weight, and the fourth weight are all real non-negative numbers.

DETAILED DESCRIPTION

Figure 1:
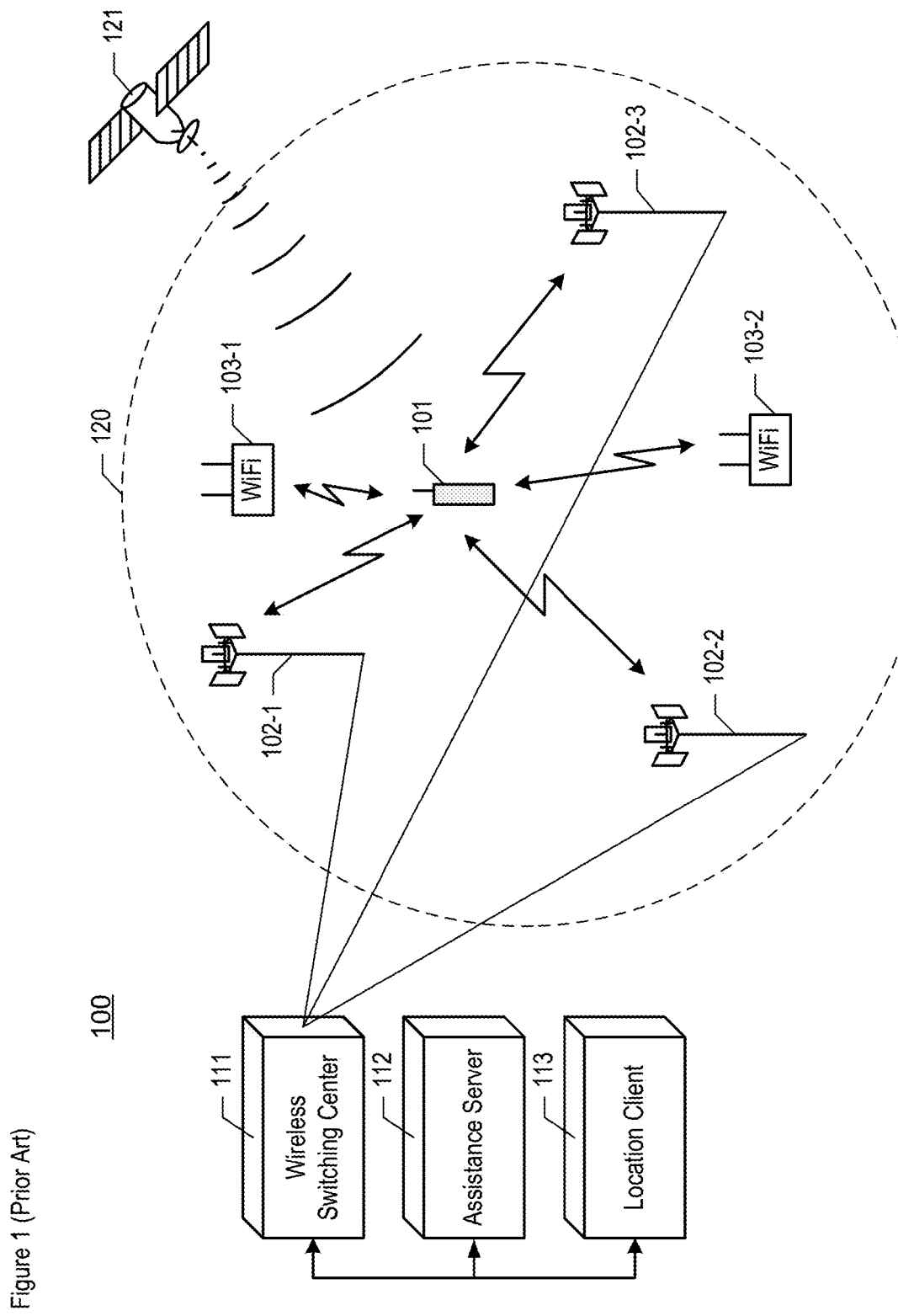
FIG. 1 depicts a diagram of the salient components of wireless telecommunications system 100 in accordance with the prior art.
Figure 2:
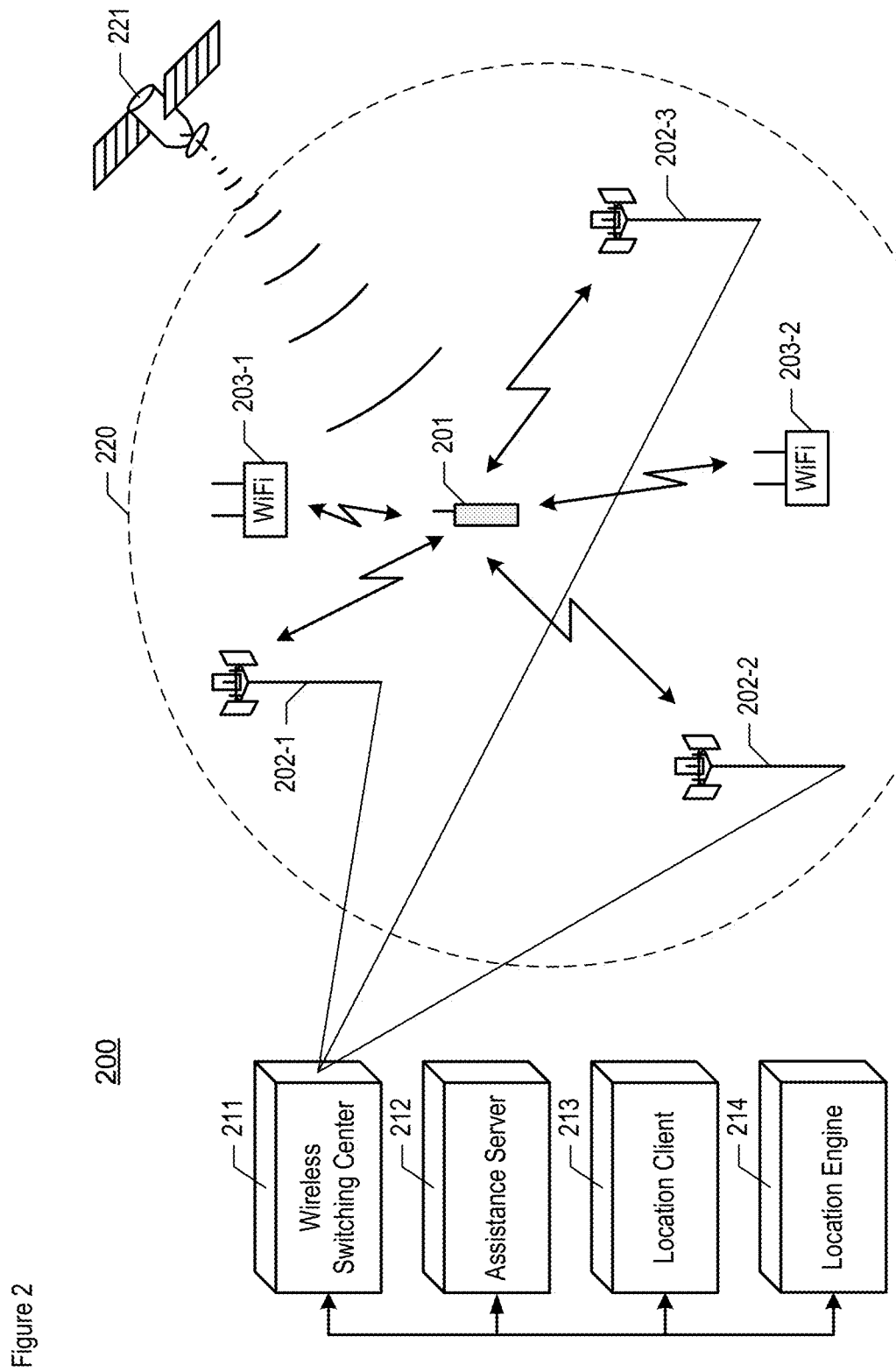
FIG. 2 depicts a diagram of the salient components of wireless telecommunications system 200 in accordance with the illustrative embodiment of the present invention.

Overview—FIG. 2 depicts a diagram of the salient components of wireless telecommunications system 200 in accordance with the illustrative embodiment of the present invention. Wireless telecommunications system 200 comprises: wireless terminal 201, cellular base stations 202-1, 202-2, and 202-3, Wi-Fi base stations 203-1 and 203-2, wireless switching center 211, assistance server 212, location client 213, location engine 214, and GPS constellation 221, which are interrelated as shown. The illustrative embodiment provides wireless telecommunications service to all of geographic region 220, in well-known fashion, hypothesizes the location of wireless terminal 201 within geographic region 220 at different times, and uses those hypotheses in a location-based application.

In accordance with the illustrative embodiment, wireless telecommunications service is provided to wireless terminal 201 in accordance with the air-interface standard of the 3rd Generation Partnership Project ("3GPP"). After reading this disclosure, however, it will be clear to those skilled in the art how to make and use alternative embodiments of the present invention that operate in accordance with one or more other air-interface standards (e.g., Global System Mobile "GSM," UMTS, CDMA-2000, IS-136 TDMA, IS-95 CDMA, 3G Wideband CDMA, IEEE 802.11 Wi-Fi, 802.16 WiMax, Bluetooth, etc.) in one or more frequency bands. As will be clear to those skilled in the art, a wireless terminal is also known as a "cell phone," "mobile station," "car phone," "PDA," and the like.

Wireless terminal 201 comprises the hardware and software necessary to be 3GPP-compliant and to perform the processes described below and in the accompanying figures. For example and without limitation, wireless terminal 201 is capable of:

a. measuring one or more location-dependent traits of each of one of more electromagnetic signals (transmitted by cellular base stations 202-1, 202-2, and 202-3 and Wi-Fi base stations 203-1 and 203-2) and of reporting the measurements to location engine 214, and b. transmitting one or more signals and of reporting the transmission parameters of those signals to location engine 214, and c. receiving GPS assistance data from assistance server 212 to assist wireless terminal 201 in acquiring and processing GPS ranging signals.

Wireless terminal 201 is mobile and can be at any location within geographic region 220 at any time. Although wireless telecommunications system 200 comprises only one wireless terminal, it will be clear to those skilled in the art, after reading this disclosure, how to make and use alternative embodiments of the present invention that comprise any number of wireless terminals.

Cellular base stations 202-1, 202-2, and 202-3 communicate with wireless switching center 211 via wireline and with wireless terminal 201 via radio in well-known fashion. As is well known to those skilled in the art, base stations are also commonly referred to by a variety of alternative names such as access points, nodes, network interfaces, etc. Although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, cellular base stations 202-1, 202-2, and 202-3 are terrestrial, immobile, and within geographic region 220. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 220.

Cellular base stations 202-1, 202-2, and 202-3 comprise the hardware and software necessary to be 3GPP-compliant and to perform the processes described below and in the accompanying figures. For example and without limitation, cellular base stations 202-1, 202-2, and 202-3 are capable of:

a. measuring one or more location-dependent traits of each of one of more electromagnetic signals (transmitted by wireless terminal 201) and of reporting the measurements to location engine 214, and b. transmitting one or more signals and of reporting the transmission parameters of those signals to location engine 214.

Wi-Fi base stations 203-1 and 203-2 communicate with wireless terminal 201 via radio in well-known fashion. Wi-Fi base stations 203-1 and 203-2 have a shorter range than cellular base stations 202-1, 202-2, and 202-3, but have a higher bandwidth. The location of Wi-Fi base stations 203-1 and 203-2 is only known to within approximately 30 meters by detecting their signals through drive testing. Wi-Fi base stations 203-1 and 203-2 are terrestrial, immobile, and within geographic region 220.

Wi-Fi base stations 203-1 and 203-2 are capable of:

c. measuring one or more location-dependent traits of each of one of more electromagnetic signals (transmitted by wireless terminal 201) and of reporting the measurements to location engine 214, and d. transmitting one or more signals and of reporting the transmission parameters of those signals to location engine 214.

Wireless switching center 211 comprises a switch that orchestrates the provisioning of telecommunications service to wireless terminal 201 and the flow of information to and from location engine 214, as described below and in the accompanying figures. As is well known to those skilled in the art, wireless switching centers are also commonly referred to by other names such as mobile switching centers, mobile telephone switching offices, routers, etc.

Although the illustrative embodiment comprises one wireless switching center, it will be clear to those skilled in the art, after reading this disclosure, how to make and use alternative embodiments of the present invention that comprise any number of wireless switching centers. For example, when a wireless terminal can interact with two or more wireless switching centers, the wireless switching centers can exchange and share information that is useful in estimating the location of the wireless terminal. For example, the wireless switching centers can use the IS-41 protocol messages HandoffMeasurementRequest and HandoffMeasurementRequest2 to elicit signal-strength measurements from one another. The use of two or more wireless switching centers is particularly common when the geographic area serviced by the wireless switching center is small (e.g., local area networks, etc.) or when multiple wireless switching centers serve a common area.

In accordance with the illustrative embodiment, all of the base stations servicing wireless terminal 201 are associated with wireless switching center 211. It will be clear to those skilled in the art, after reading this disclosure, how to make and use alternative embodiments of the present invention in which any number of base stations are associated with any number of wireless switching centers.

Assistance server 212 comprises hardware and software that is capable of performing the processes described below and in the accompanying figures. In general, assistance server 212 generates GPS assistance data for wireless terminal 201 to aid wireless terminal 201 in acquiring and processing GPS ranging signals from GPS constellation 221. In accordance with the illustrative embodiment, assistance server 212 is a separate physical entity from location engine 214; however, it will be clear to those skilled in the art, after reading this disclosure, how to make and use alternative embodiments of the present invention in which assistance server 212 and location engine 214 share hardware, software, or both.

Location client 213 comprises hardware and software that uses the hypothesis for the location of wireless terminal 201—provided by location engine 214—in a location-based application, as described below and in the accompanying figures.

Location engine 214 comprises hardware and software that generates one or more hypotheses of the location of wireless terminal 201 as described below and in the accompanying figures. It will be clear to those skilled in the art, after reading this disclosure, how to make and use location engine 214. Furthermore, although location engine 214 is depicted in FIG. 2 as physically distinct from wireless switching center 211, it will be clear to those skilled in the art, after reading this disclosure, how to make and use alternative embodiments of the present invention in which location engine 214 is wholly or partially integrated with wireless switching center 211.

In accordance with the illustrative embodiment, location engine 214 communicates with wireless switching center 211, assistance server 212, and location client 213 via a local area network; however it will be clear to those skilled in the art, after reading this disclosure, how to make and use alternative embodiments of the present invention in which location engine 214 communicates with one or more of these entities via a different network such as, for example, the Internet, the Public Switched Telephone Network (PSTN), a wide area network, etc.

In accordance with the illustrative embodiment, wireless switching center 211, assistance server 212, location client 213, and location engine 214 are physically located within geographic region 220. It will be clear to those skilled in the art, however, after reading this disclosure, how to make and use alternative embodiments of the present invention in which some or all of wireless switching center 211, assistance server 212, location client 213, and location engine 214 are physically located outside of geographic region 220.

Figure 3:
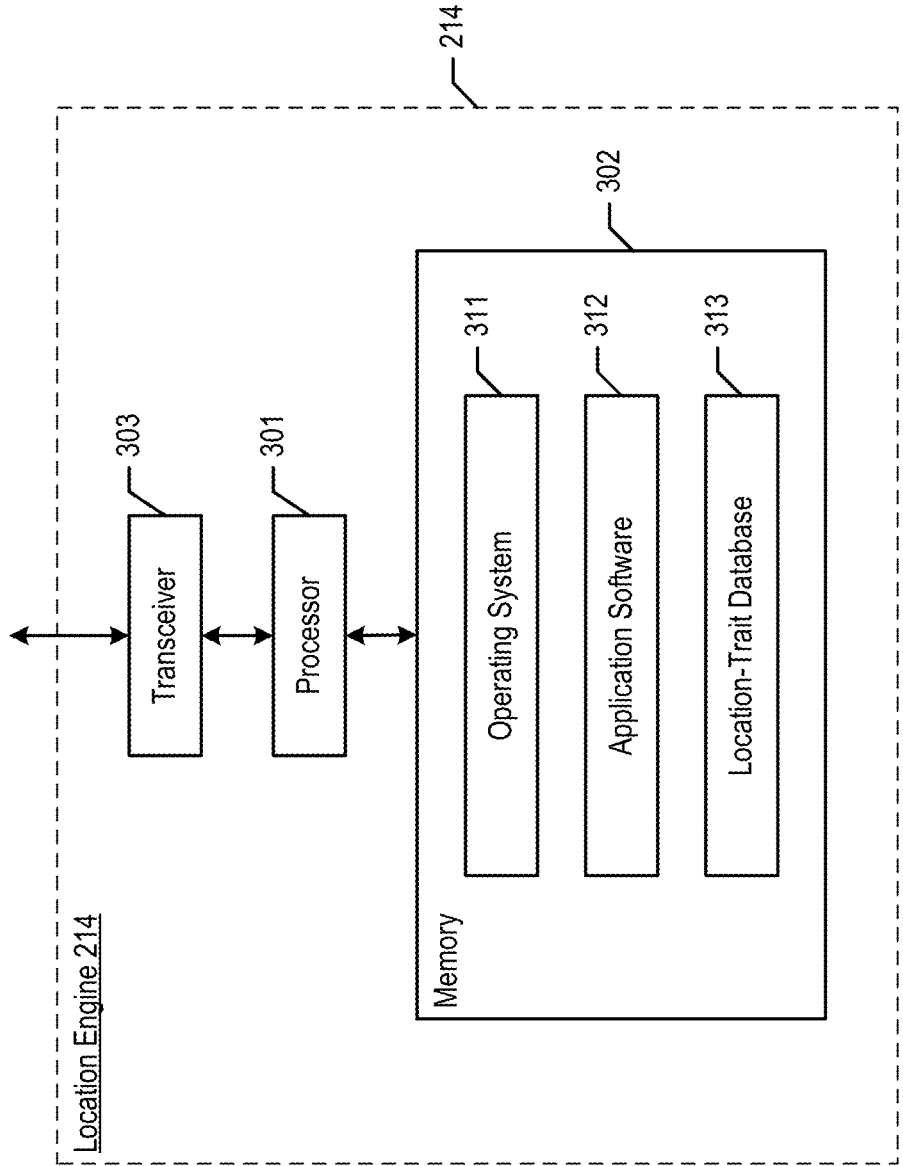
FIG. 3 depicts a block diagram of the salient components of location engine 214 in accordance with the illustrative embodiment.

Location engine 214—FIG. 3 depicts a block diagram of the salient components of location engine 214 in accordance with the illustrative embodiment. Location engine 214 comprises: processor 301, memory 302, and local-area network transmitter/receiver 303, which are interconnected as shown.

Processor 301 is a general-purpose processor that is capable of executing operating system 311 and application software 312, and of populating, amending, using, and managing Location-Trait Database 313, as described in detail below and in the accompanying figures. For the purposes of this specification, a "processor" is defined as one or more computational elements, whether co-located or not and whether networked together or not.

For the purposes of this specification, the "Location-Trait Database" is defined as a database that associates one or more location-dependent traits of electromagnetic signals processed (i.e., transmitted and/or received) by wireless terminal 201 with each of a plurality of locations. In general, the Location-Trait Database is what enables location engine 214 to convert observed location-dependent traits into an estimate for the location of wireless terminal 201. It will be clear to those skilled in the art how to make and use processor 301.

Memory 302 is a non-volatile memory that stores:
a. operating system 311, and
b. application software 312, and
c. Location-Trait Database 313.

It will be clear to those skilled in the art how to make and use memory 302.

Transmitter/receiver 303 enables location engine 214 to transmit and receive information to and from wireless switching center 211, assistance server 212, and location client 213. In addition, transmitter/receiver 303 enables location engine 214 to transmit information to and receive information from wireless terminal 201 and cellular base stations 202-1 through 202-3 via wireless switching center 211. It will be clear to those skilled in the art how to make and use transmitter/receiver 303.

Figure 4:
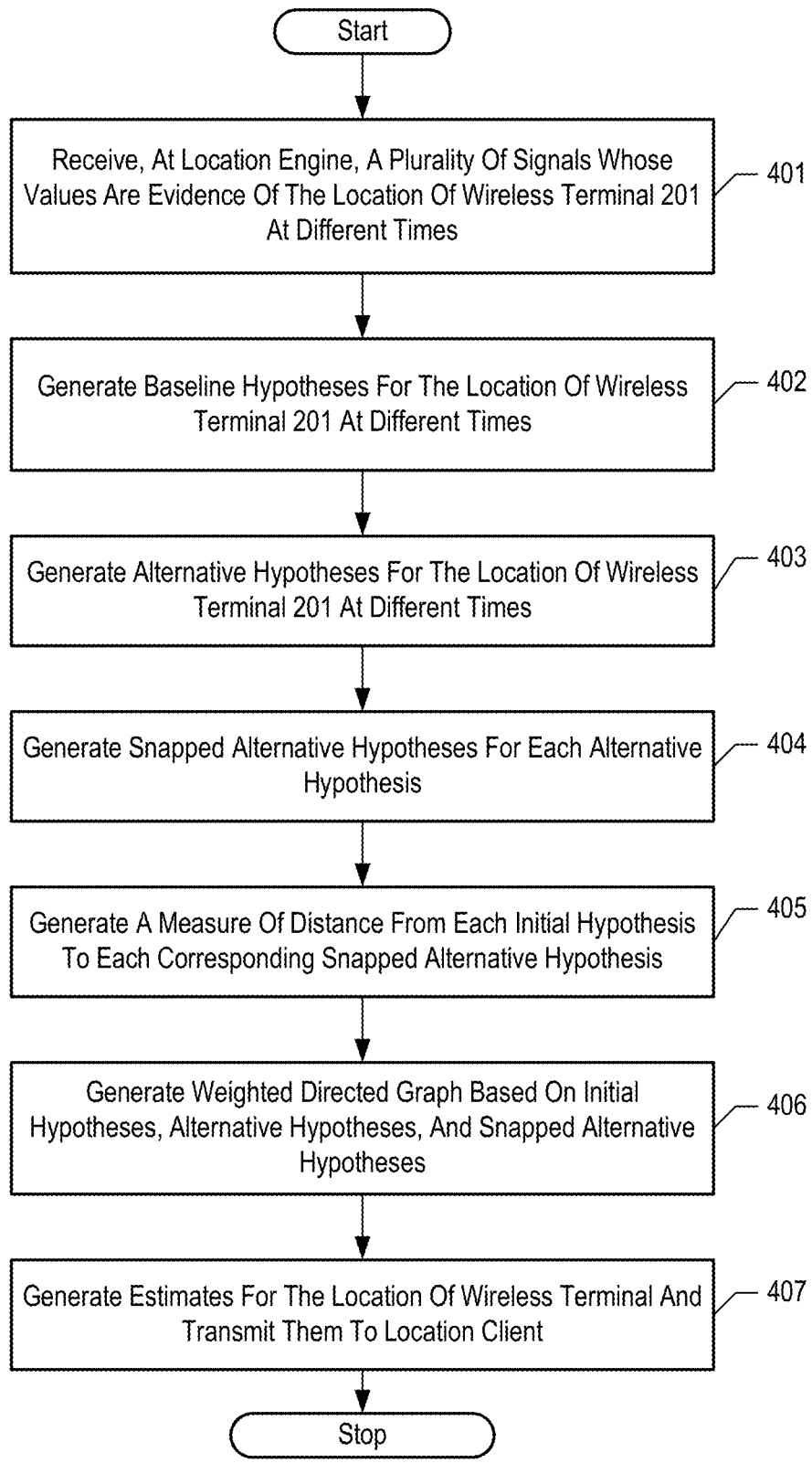
FIG. 4 depicts a flowchart of the salient processes performed in accordance with the illustrative embodiment of the present invention.

Operation of the Illustrative Embodiment—FIG. 4 depicts a flowchart of the salient processes performed in accordance with the illustrative embodiment of the present invention.

At task 401, location engine 214 receives signals from wireless switching center 211 whose values are evidence of the location of wireless terminal 201 at different times. Each signal radiates from a different source (e.g., cellular base stations 202-1, 202-2, and 202-3, Wi-Fi base stations 203-1 and 203-2, wireless terminal 201, etc.). Table 1 depicts three signals, S(1), S(2), and S(3), and the values of those signals at times t(1), t(2), t(3), and t(4).

TABLE 1

Nine signals whose values are evidence of the location of wireless terminal 201 in geographic region 220 at four different times.

| time | Signal S(1) | Signal S(2) | Signal S(3) |
|---|---|---|---|
| t(1) | SV(1, 1) | SV(1, 2) | Not Available |
| t(2) | SV(2, 1) | SV(2, 2) | SV(2, 3) |
| t(3) | SV(3, 1) | Not Available | SV(3, 3) |
| t(4) | Not Available | SV(4, 2) | SV(4, 3) |

In the signal value $SV(t, j)$, t represents the time for which the signal is evidence, and j represents the source of the signal.

In accordance with the illustrative embodiment, the value of each signal is a signal-strength measurement made by wireless terminal 201 of a radio signal transmitted by one of cellular base stations 202-1 and 202-2 and Wi-Fi base station 203-1. It will be clear to those skilled in the art, however, after reading this disclosure, how to make and use alternative embodiments of the present invention in which the value of each received signal is a measurement of any location-dependent trait of an electromagnetic signal that is evidence of the location of wireless terminal 201. For example and without limitation, each signal can be:

i. evidence of the propagation delay—in either one-direction or round-trip—between wireless terminal 120 and another entity (e.g., a cellular base station, a GPS satellite, a Wi-Fi base station, etc.), or ii evidence of the time difference of arrival of a signal transmitted by wireless terminal 201 and two other entities (e.g., a cellular base station, a GPS satellite, a Wi-Fi base station, etc.), or iii. evidence of the angle of arrival of a signal transiting between wireless terminal 201 and another entity (e.g., a cellular base station, a GPS satellite, a Wi-Fi base station, etc.), or iv. evidence that wireless terminal 201 can receive and decode a signal from another entity (e.g., a cellular base station, a GPS satellite, a Wi-Fi base station, etc.), or v. evidence that an entity (e.g., a cellular base station, a GPS satellite, a Wi-Fi base station, etc.) can receive and decode a signal from wireless terminal 201, or vi. evidence of any location-dependent trait (e.g., signal strength, rake receiver coefficients, phase delay, etc.) of an electromagnetic signal that is processed by wireless terminal 201, or vii. any combination of i, ii, iii, iv, v, or vi.

In accordance with the illustrative embodiment, three signals are received for time t(2) but only two signals are received for times t(1), t(3), and t(4) because signal value SV(1, 3), SV(3, 2) and SV(4, 1) were not measured or reported. It will be clear to those skilled in the art, however, after reading this disclosure, how to make and use alternative embodiments of the present invention in which any number of signals are received and used for each moment of time.

In accordance with the illustrative embodiment, all of the signals are evidence of the same type of physical quantity (i.e., received signal strength), but it will be clear to those skilled in the art, after reading this disclosure, how to make and use alternative embodiments of the present invention in which the type of physical quantity represented varies (e.g., three signal-strength measurements are received for one moment, one signal-strength measurement and two time-difference of arrival measurements are received for the next moment, etc.). In accordance with the illustrative embodiment, there is signal data available for four moments of time, but it will be clear to those skilled in the art, after reading this disclosure, how to make and use alternative embodiments of the present invention in which data is available for any number of moments.

At task 402, location engine 214 generates an "initial" hypothesis for the location of wireless terminal 201 at each of times t(1), t(2), t(3), and t(4). Each hypothesis and each estimate of the location of wireless terminal 201 is a latitude-longitude pair.

Each initial hypothesis for the location of wireless terminal 201 is a hypothesis that does not discount the probative value of any signal value. In other words, all of the signals that are evidence of the location of wireless terminal 201 at one time are accorded equal probity for the purposes of creating the initial hypotheses. In practice, this is achieved by weighting each signal value SV(t, j) with weight W(t, j, 0), wherein W(t, j, 0) are equal and non-negative real values for all t and all j.

In accordance with the illustrative embodiment, location engine 215 generates the initial hypotheses using the signals received at task 401 and the technique of wireless location signatures. The wireless location signatures technique is well-known to those skilled in the art and is taught, for example, in U.S. Pat. No. 7,257,414 B2, which is incorporated by reference. It will be clear to those skilled in the art, after reading this disclosure, how to make and use alternative embodiments of the present invention in which the initial hypotheses are generated using:
    i. wireless location signatures, or
    ii. triangulation, or
    iii. trilateration, or
    iv. cellular-base-station cell identification, or
    v. Wi-Fi-base-station cell identification, or
    vi. any combination of i, ii, iii, iv, and v.

At time t(2), the initial hypothesis is based on three signals, but at times t(1), t(3), and t(4) the initial hypotheses are based on only two signals. Table 2 depicts the values of each of the four initial hypotheses.

TABLE 2

The initial locations of wireless terminal 201 in geographic region 220 at four different times.

| time | Initial Hypothesis |
|---|---|
| t(1) | IH(1) |
| t(2) | IH(2) |
| t(3) | IH(3) |
| t(4) | IH(4) |

Figure 5:
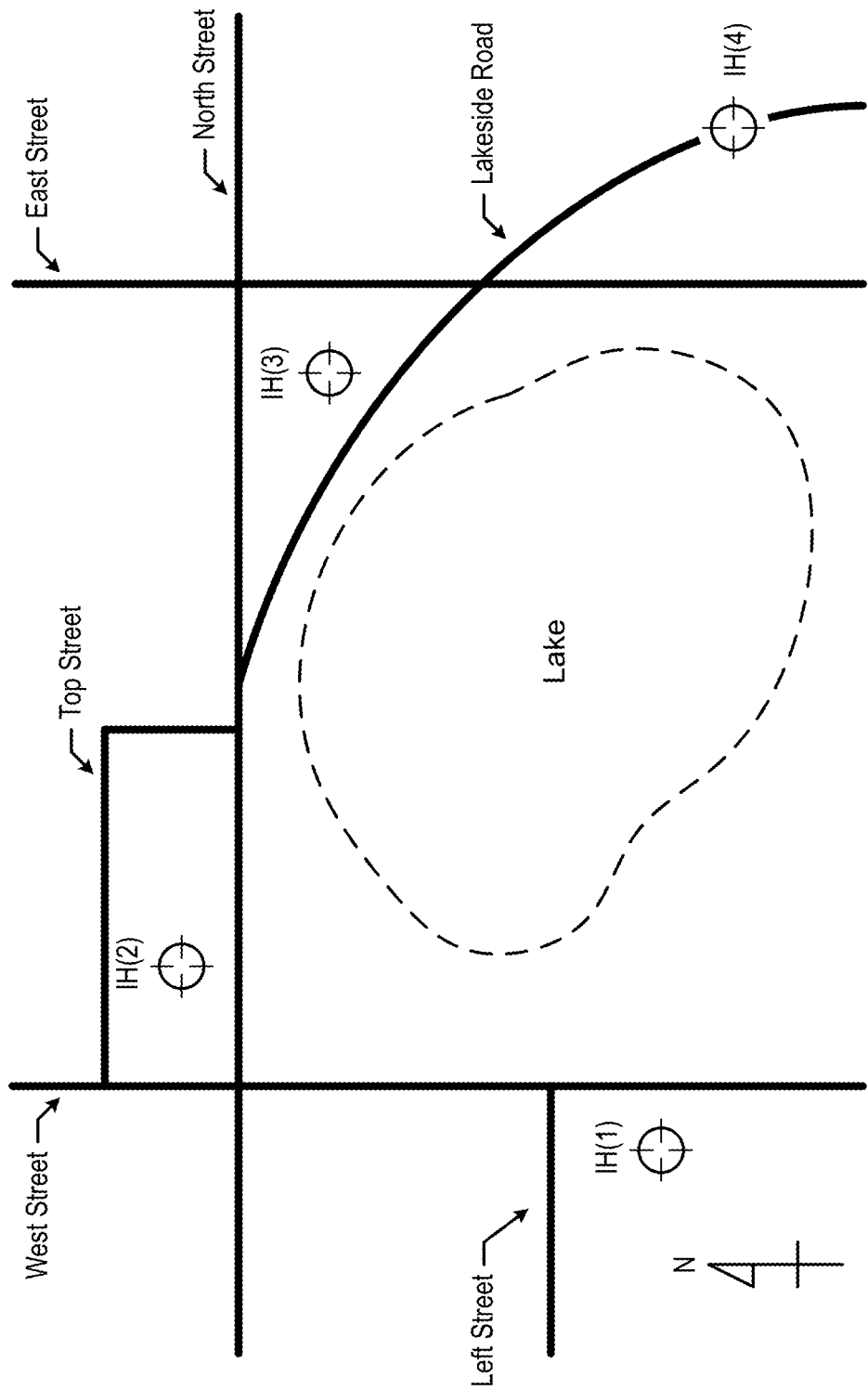
FIG. 5 depicts a road map of geographic region 220 that indicates the four initial hypotheses from Table 2.

FIG. 5 depicts a road map of geographic region 220 that indicates the four initial hypotheses from Table 2. In the map the initial hypothesis for the location of wireless terminal 201 at time t(i) is depicted by a bull's-eye with the identifier IH(i).

Therefore, the initial hypothesis IH(1) for wireless terminal 201 at time t(1) is on West Street, just south of Left Street. The initial hypothesis IH(2) at time t(2) is between Top Street and North Street, just east of West Street. The ambiguity of whether wireless terminal 201 was on Top Street or North Street at time t(2) is undesirable because a known drug-dealer operates on Top Street and it would be advantageous to know whether the operator of wireless terminal 201 might be involved with the drug dealer or not. The illustrative embodiment of the present invention resolves that ambiguity beginning in task 403 below. The initial hypothesis IH(3) for wireless terminal 201 at time t(3) is between Lakeside Road, North Street, and East Street. The initial hypothesis IH(4) at time t(4) is unambiguously on Lakeside Road.

In accordance with the illustrative embodiment, the initial hypotheses are used as is, but it will be clear to those skilled in the art, after reading this disclosure, how to make and use alternative embodiments of the present invention in which one or more of the initial hypotheses are "snapped" or repositioned to one or more roadways or other transportation paths in the vicinity of the initial hypothesis.

Referring again to FIG. 4, at task 403 location engine 214 generates additional "alternative" hypotheses for the location of wireless terminal 201 at each time for which two or more signal values are available. Each alternative hypothesis is also a hypothesis for the location of wireless terminal 201.

In accordance with the illustrative embodiment, location engine 214 uses the same location technique to generate the alternative hypotheses as it did to generate the initial hypotheses in task 402. It will be clear to those skilled in the art, however, after reading this disclosure, how to make and use alternative embodiments of the present invention in which the candidates hypotheses are generated using an alternative method, such as:
    i. wireless location signatures, or
    ii. triangulation, or
    iii. trilateration, or
    iv. cellular-base-station cell identification, or
    v. Wi-Fi-base-station cell identification, or
    vi. any combination of i, ii, iii, iv, and v.

In accordance with the illustrative embodiment, each alternative hypothesis for a given time is generated by discounting as unreliable exactly one signal value. For example, when there are N>1 signal values available for a given time, there are N alternative hypotheses generated for that time. When there is only one signal available for a given time, no alternative hypotheses are generated because the one signal value cannot be discounted with respect to itself.

It will be clear to those skilled in the art, however, how to make and use alternative embodiments of the present invention in which there are a different number of alternative hypotheses generated for a given time (e.g., 1, 2, 3, N-1, $2^N$-2, N!, etc.). For example, it will be clear to those skilled in the art, after reading this disclosure, how to make and use alternative embodiments of the present invention in which each alternative hypothesis for a given time is generated by discounting as unreliable every combination of signal values. This would generate $2^N$-2 alternative hypotheses. Furthermore, some alternative embodiments of the present invention could discount each signal value by a continuous value, which would generate up to N! alternative hypotheses.

In practice, the illustrative embodiment generates each alternative hypothesis AH(t, k) for the location of wireless terminal 201 at time t by weighting each signal value SV(t, j) with weight W(t, j, k), wherein W(t, j, k) is a non-negative real value for all times i, all signals j, and all hypotheses k. It will be clear to those skilled in the art, after reading this disclosure, how to make and use alternative embodiments of the present invention in which some or all of the discounted signal's values have a weight of zero (0).

Table 3 depicts signals SV(1, 1) and SV(1, 2) and their associated weights for the purposes of generating alternative hypotheses AH(1, 1) and AH(1, 2).

TABLE 3

The weights and their relationships for generating the alternative hypotheses at time t(1).

| Alternative Hypothesis | Signal SV(1, 1) | Signal SV(1, 2) | Signal SV(1, 3) | Weight Relationship |
|---|---|---|---|---|
| AH(1, 1) | W(1, 1, 1) | W(1, 2, 1) | Not Available | W(1, 1, 1) < W(1, 2, 1) |
| AH(1, 2) | W(1, 1, 2) | W(1, 2, 2) | Not Available | W(1, 1, 2) > W(1, 2, 2) |
| Not Applicable | Not Applicable | Not Applicable | Not Available | Not Applicable |

Table 4 depicts signals SV(2, 1), SV(2, 2), and SV(2, 3) and their associated weights for the purposes of generating alternative hypotheses AH(2, 1), AH(2, 2), and AH(2, 3).

TABLE 4

The weights and their relationships for generating the alternative hypotheses at time t(2).

| Alternative Hypothesis | Signal SV(2, 1) | Signal SV(2, 2) | Signal SV(2, 3) | Weight Relationship |
|---|---|---|---|---|
| AH(2, 1) | W(2, 1, 1) | W(2, 2, 1) | W(2, 3, 1) | W(2, 1, 1) < W(2, 2, 1)<br>W(2, 1, 1) < W(2, 3, 1)<br>W(2, 2, 1) = W(2, 3, 1) |
| AH(2, 2) | W(2, 1, 2) | W(2, 2, 2) | W(2, 3, 2) | W(2, 2, 2) < W(2, 1, 2)<br>W(2, 2, 2) < W(2, 3, 2)<br>W(2, 1, 2) = W(2, 3, 2) |
| AH(2, 3) | W(2, 1, 3) | W(2, 2, 3) | W(2, 3, 3) | W(2, 3, 3) < W(2, 1, 3)<br>W(2, 3, 3) < W(2, 2, 3)<br>W(2, 1, 3) = W(2, 2, 3) |

In Table 4, W(2, 2, 1)=W(2, 3, 1), W(2, 1, 2)=W(2, 3, 2), and W(2, 1, 3)=W(2, 2, 3), but it will be clear to those skilled in the art, after reading this disclosure, how to make and use alternative embodiments of the present invention in which some or all of these relationships are not true in order to partially discount some signal values. For example, W(2, 2, 1)<W(2, 3, 1), W(2, 1, 2)<W(2, 3, 2), W(2, 1, 3)<W(2, 2, 3), W(2, 2, 1)>W(2, 3, 1), W(2, 1, 2)>W(2, 3, 2), and W(2, 1, 3)>W(2, 2, 3).

Table 5 depicts signals SV(3, 1) and SV(3, 3) and their associated weights for the purposes of generating alternative hypotheses AH(3, 1) and AH(3, 3).

TABLE 5

The weights and their relationships for generating the alternative hypotheses at time t(3).

| Alternative Hypothesis | Signal SV(3, 1) | Signal SV(3, 2) | Signal SV(3, 3) | Weight Relationship |
|---|---|---|---|---|
| AH(3, 1) | W(3, 1, 1) | Not Available) | W(3, 3, 1) | W(3, 1, 1) < W(3, 3, 1) |
| Not Applicable | Not Applicable | Not Available | Not Applicable | Not Applicable |
| AH(3, 3) | W(3, 1, 3) | Not Available | W(3, 3, 3) | W(3, 1, 3) > W(3, 3, 3) |

Table 6 depicts signal values SV(4, 2), and SV(4, 3) and their associated weights for the purposes of generating alternative hypotheses AH(4, 2), and AH(4, 3).

TABLE 6

The weights and their relationships for generating the alternative hypotheses at time t(4).

| Alternative Hypothesis | Signal SV(4, 1) | Signal SV(4, 2) | Signal SV(4, 3) | Weight Relationship |
|---|---|---|---|---|
| Not Applicable | Not Available | Not Applicable | Not Applicable | Not Applicable |
| AH(4, 2) | Not Available | W(4, 2, 2) | W(4, 3, 2) | W(4, 2, 2) < W(4, 3, 2) |
| AH(4, 3) | Not Available | W(4, 2, 3) | W(4, 3, 3) | W(4, 2, 3) > W(4, 3, 3) |

Figure 6:
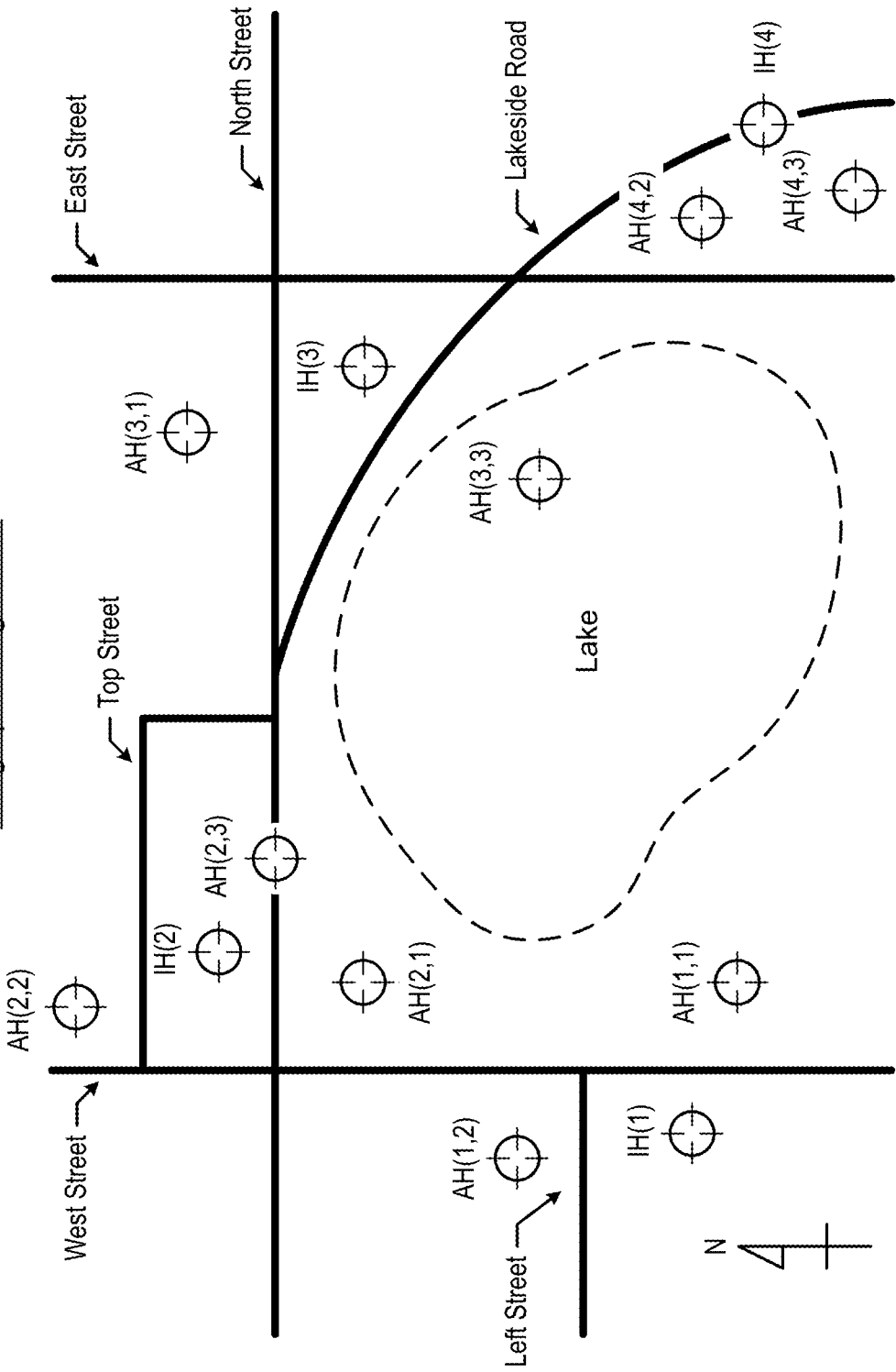
FIG. 6 depicts a road map of geographic region 220 that indicates the nine alternative hypotheses generated in task 403.

FIG. 6 depicts a road map of geographic region 220 that indicates the four initial hypotheses generated in task 402 plus the nine alternative hypotheses generated in task 403. In the map the alternative hypotheses of the location of wireless terminal 201 are represented by a bull's-eye with the identifier AH(t, k).

In general, the alternative hypotheses for time t(t) are in the general vicinity of the initial hypotheses for the same time, as generally would be expected. But the generation and mapping of the alternative hypotheses does not, per se, resolve the ambiguities presented by the initial hypotheses. For example, the alternative hypothesis AH(1,2) on Left Street and the alternative hypothesis AH(1, 1) on West Street do not unambiguously resolve the question presented by the initial hypothesis IH(1) of whether wireless terminal 201 was on West Street or Left Street at time t(1). Ambiguities like these are resolved beginning in task 404 below.

At task 404, location engine 214 generates a snapped alternative hypothesis SAH(t, k) for each alternative hypothesis AH(t, k). The snapped alternative hypothesis SAH(t, k) is also a hypothesis for the location of wireless terminal 201.

Figure 7:
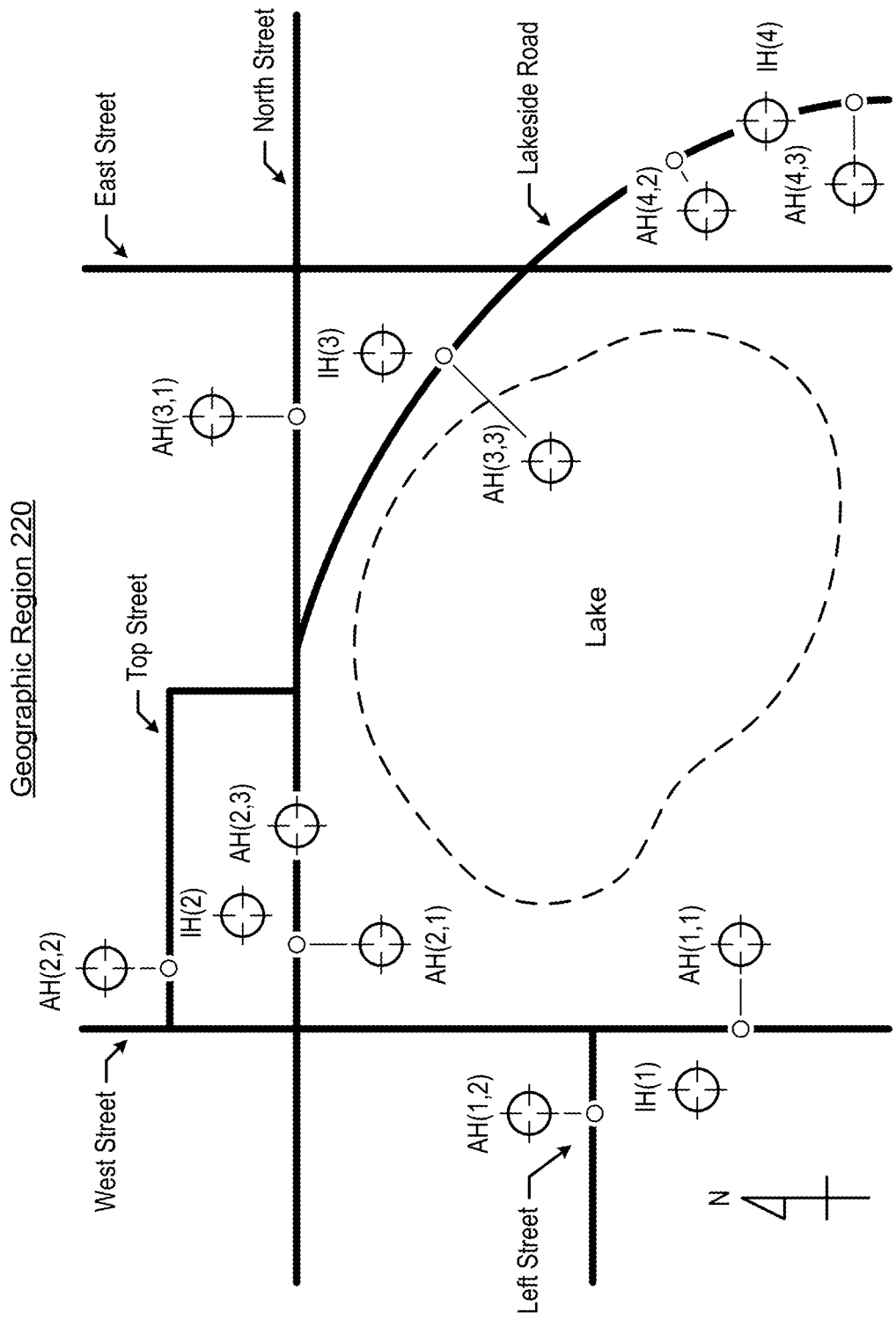
FIG. 7 depicts a road map of geographic region 220 that indicates the nine snapped alternative hypotheses generated in task 403.

In accordance with the illustrative embodiment, the snapped alternative hypothesis SAH(t, k) is a location on a road that is the shortest Euclidean distance between the alternative hypothesis AH(t, k) and any point on any road. The snapped alternative hypothesis SAH(t, k) corresponding to each alternative hypothesis AH(t, k) is depicted in Table 7 and FIG. 7.

TABLE 7

The alternative hypotheses and their corresponding snapped alternative hypotheses.

| Alternative Hypothesis | Snapped Alternative Hypothesis |
|---|---|
| AH(1, 1) | SAH(1, 1) |
| AH(1, 2) | SAH(1, 2) |
| AH(2, 1) | SAH(2, 1) |
| AH(2, 2) | SAH(2, 2) |
| AH(2, 3) | SAH(2, 3) |
| AH(3, 1) | SAH(3, 1) |
| AH(3, 3) | SAH(3, 3) |
| AH(4, 2) | SAH(4, 2) |
| AH(4, 3) | SAH(4, 3) |

In accordance with the illustrative embodiment, there is one snapped alternative hypothesis for each alternative hypothesis, but it will be clear to those skilled in the art, after reading this disclosure, how to make and use alternative embodiments of the present invention in which some or all of the alternative hypothesis have a plurality of snapped alternative hypotheses.

Referring again to FIG. 4, at task 405, location engine 214 generates a measure of distance between each snapped alternative hypothesis SAH(t, k) and the corresponding initial hypothesis B(t) to generate a measure of discrepancy MOD(t, k). In accordance with the illustrative embodiment, the measure of distance is the Euclidean distance. The measures of discrepancy are depicted in Table 8.

TABLE 8

The alternative hypotheses and their associated measures of discrepancy.

| Snapped Alternative Hypothesis | Corresponding Initial Hypothesis | Measure of Discrepancy |
| --- | --- | --- |
| SAH(1, 1) | B(1) | MOD(1, 1) |
| SAH(1, 2) | B(1) | MOD(1, 2) |
| SAH(2, 1) | B(2) | MOD(2, 1) |
| SAH(2, 2) | B(2) | MOD(2, 2) |
| SAH(2, 3) | B(2) | MOD(2, 3) |
| SAH(3, 1) | B(3) | MOD(3, 1) |
| SAH(3, 3) | B(3) | MOD(3, 3) |
| SAH(4, 2) | B(4) | MOD(4, 2) |
| SAH(4, 3) | B(4) | MOD(4, 3) |

At task 406, location server 214 generates a weighted directed graph that comprises:
(i) a node that corresponds to each initial hypothesis B(t), for all t, and
(ii) a node that corresponds to each snapped alternative hypothesis SAH(t, k), for all t and all k, and
(iii) a directed link from each initial hypothesis B(t) to initial hypothesis B(t+1), for all t, and
(iv) a directed link from each initial hypothesis B(t) to each snapped alternative hypothesis SAH(t+1, k), for all t and all k, and
(v) a directed link from each snapped alternative hypothesis SAH(t, k) to each initial hypothesis B(t+1), for all t and all k, and
(vi) a directed link from each snapped alternative hypothesis SAH(t, k) to each snapped alternative hypothesis SAH(t+1, k) for all t and all k.

Figure 8:
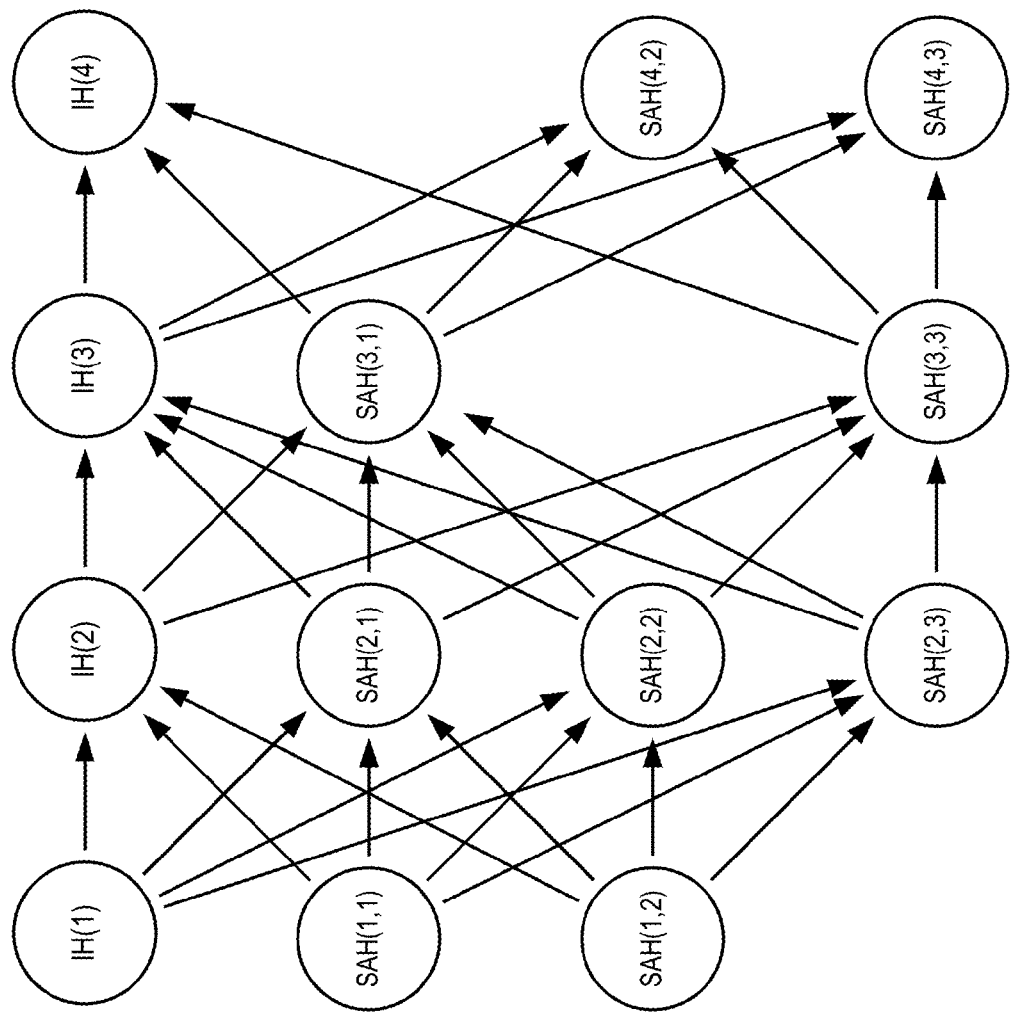
FIG. 8 depicts the weighted directed graph that corresponds the initial hypotheses and snapped alternative hypotheses generated in task 406.

The result is a directed graph, as shown in FIG. 8, that represents every possible combination of paths from time t(1) to time t(4). All of the nodes that correspond to the same time t are depicted in a single column, and the nodes corresponding to time t are depicted in a column to the left of the nodes corresponding to time t+1.

In accordance with the illustrative embodiment,
(i) each node that corresponds to a initial hypothesis B(t) has an associated cost of zero (0), and
(ii) each node that corresponds to a snapped alternative hypothesis SAH(t, k) has an associated cost equal to its associated measure of discrepancy MOD(t, k), and
(iii) each directed link from node X to node Y has a cost equal to a measure of the distance between the location associated with node X and the location associated with node Y.

In accordance with the illustrative embodiment, the measure of distance from node X to node Y is the road travel time, but it will be clear to those skilled in the art, after reading this disclosure, how to make and use alternative embodiments of the present invention in which the measure of distance is another metric, such as for example and without limitation, the Euclidean distance from node X to node Y, the road travel time, etc.

At task 407, location server 214 generates an estimate E(t) for the location of wireless terminal 201 for all t. To accomplish this, location server 214 determines the minimum-cost path through the graph constructed in task 406 using well-known dynamic programming techniques.

Once the minimum-cost path has been determined, the nodes in the minimum-cost path constitute the final, best estimates of the location of wireless terminal 201 at each time.

Figure 9:
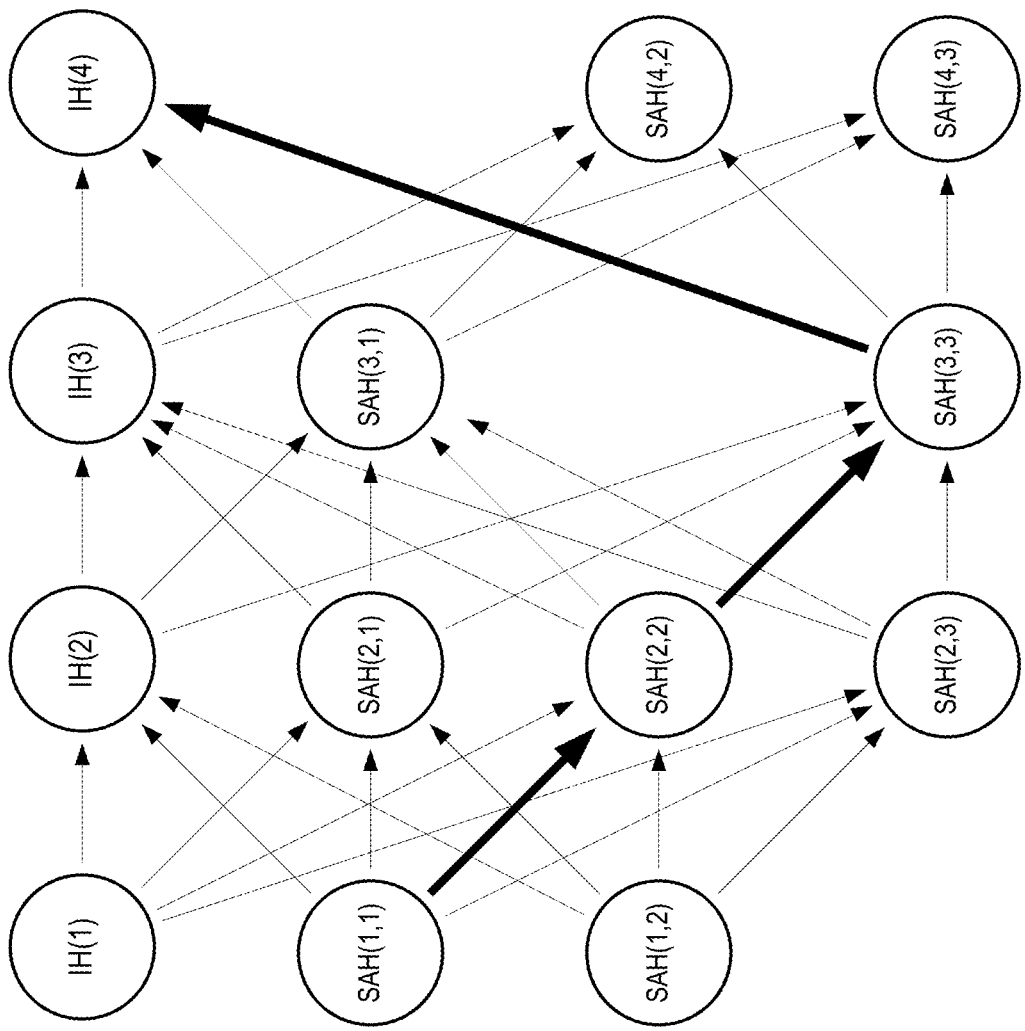
FIG. 9 depicts the minimum weight path through the weighted directed graph depicted in FIG. 8.

The minimum-cost path through the directed graph is depicted in FIG. 9 as beginning at snapped alternative hypothesis SAH(1, 1), proceeding to snapped alternative hypothesis SAH(2, 3), proceeding to snapped alternative hypothesis SAH(3, 3), and terminating at initial hypothesis IH(4). Therefore, E(1) is the location corresponding to snapped alternative hypothesis SAH(1, 1), E(2) is the location corresponding to base hypothesis SAH(2, 3), E(3) is the location corresponding to snapped alternative hypothesis SAH(3, 3), and E(4) is the location corresponding to snapped alternative hypothesis IH(4). This is summarized in Table 9.

TABLE 9

The alternative hypotheses and their corresponding hypotheses.

| Estimate | Hypothesis |
| --- | --- |
| E(1) | SAH(1, 1) |
| E(2) | SAH(2, 2) |
| E(3) | SAH(3, 3) |
| E(4) | IH(4) |

Figure 10:
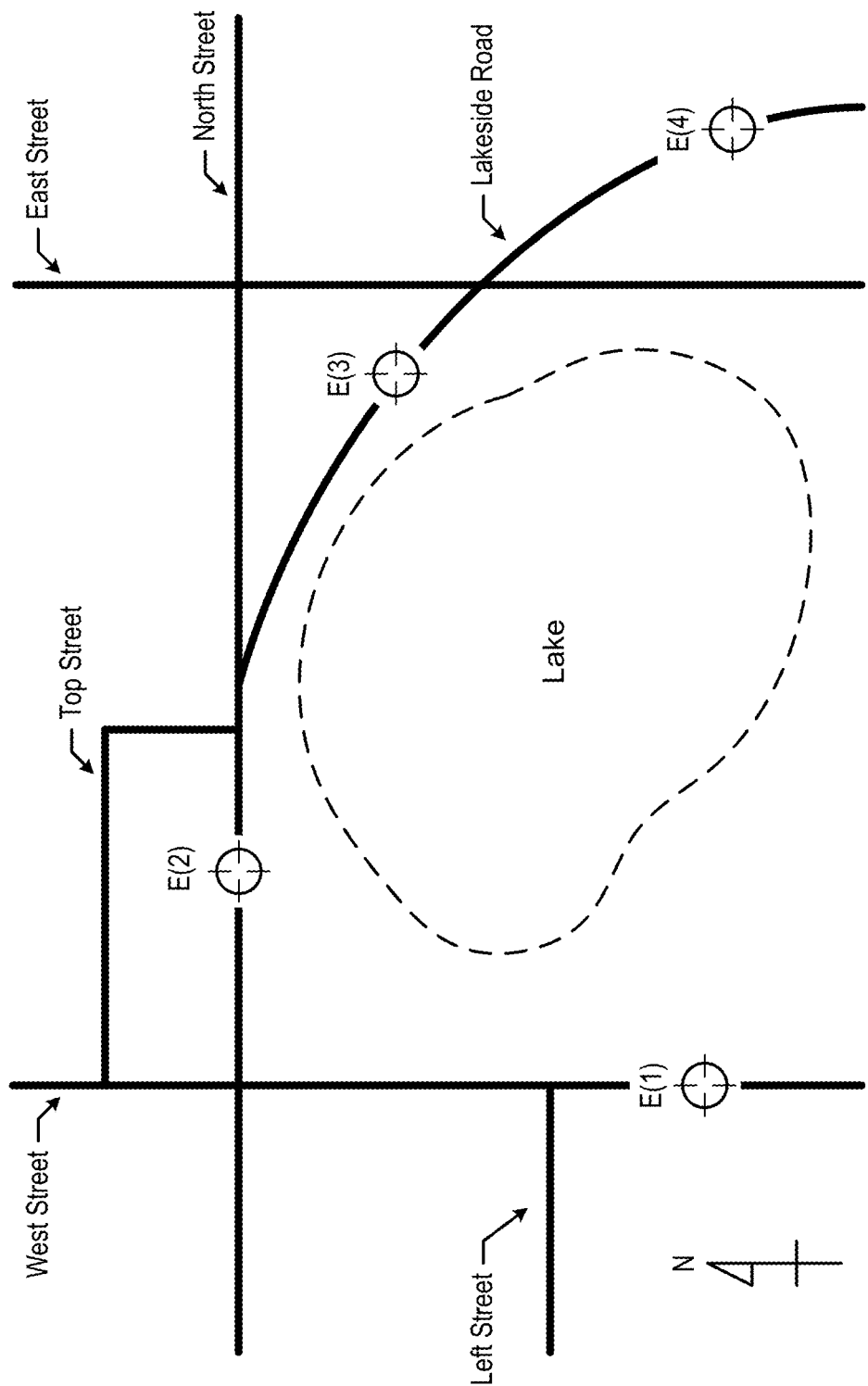
FIG. 10 depicts the road map of geographic region 220 that indicates the final refined hypotheses of the location of wireless terminal at time t, for all t.

FIG. 10 depicts the road map of geographic region 220 that indicates the final refined hypotheses of the location of wireless terminal at time t, for all t. As part of task 407, each of the refined hypotheses is transmitted from location engine 214 to location client 213 for use in a location-based application.

What is claimed is:

1. A method of estimating the location of a wireless terminal, the method comprising:
receiving, at a location engine, a first signal value whose value is evidence of the location of the wireless terminal at time t(1);
receiving, at the location engine, a second signal value whose value is evidence of the location of the wireless terminal at time t(1);
generating, at the location engine, a first hypothesis for the location for the wireless terminal at time t(1) based on the first signal value having first weight and the second signal value having second weight, wherein the first weight is greater than the second weight;
generating, at the location engine, a second hypothesis for the location for the wireless terminal at time t(1) based on the nearness of a location on a road in relation to the first hypothesis for the location of the wireless terminal at time t(1); and
generating, at the location engine, an estimate for the location of the wireless terminal at time t(2) based on:
(i) the second hypothesis for the location for the wireless terminal at time t(1); and
transmitting, from the location engine, the estimate for the location of the wireless terminal at time t(2) for use by a location-based application;
wherein the first weight and the second weight are both real non-negative numbers.

2. The method of claim 1 further comprising:
generating, at the location engine, a third hypothesis for the location for the wireless terminal at time t(1) based on the first signal value having a third weight and the second signal value having a fourth weight, wherein the third weight equals the fourth weight; and wherein the estimate for the location of the wireless terminal at time t(2) is also based on:
  (ii) the third hypothesis for the location for the wireless terminal at time t(1).

3. The method of claim 2 wherein the estimate for the location of the wireless terminal at time t(2) is also based on:
  (iii) a measure of distance between the second hypothesis for the location for the wireless terminal at time t(1) and the third hypothesis for the location for the wireless terminal at time t(1).

4. The method of claim 1 wherein time t(1) occurs before time t(2).

5. The method of claim 1 wherein time t(2) occurs before time t(1).

6. The method of claim 1 further comprising:
  receiving, at the location engine, a third signal value whose value is evidence of the location of the wireless terminal at time t(2); and
  generating, at the location engine, a first hypothesis for the location for the wireless terminal at time t(2) based on the third signal value;
  wherein the estimate for the location of the wireless terminal at time t(2) is also based on:
    (ii) a measure of distance between the first hypothesis for the location for the wireless terminal at time t(1) and the first hypothesis for the location for the wireless terminal at time t(2).

7. The method of claim 6 wherein the measure of distance is the road travel time.

8. The method of claim 1 wherein the second hypothesis for the location of the wireless terminal at time t(1) is a location on a road that is the shortest Euclidean distance between the first hypothesis for the location of the wireless terminal at time t(1) and any point on any road.

9. A method of estimating the location of a wireless terminal, the method comprising:
  receiving, at a location engine, a first signal value whose value is evidence of the location of the wireless terminal at time t(1);
  receiving, at the location engine, a second signal value whose value is evidence of the location of the wireless terminal at time t(1);
  receiving, at the location engine, a third signal value whose value is evidence of the location of the wireless terminal at time t(2);
  generating, at the location engine, a first hypothesis for the location for the wireless terminal at time t(1) based on the first signal value having first weight and the second signal value having second weight, wherein the first weight is greater than the second weight;
  generating, at the location engine, a second hypothesis for the location for the wireless terminal at time t(1) based on the nearness of a location on a road in relation to the first hypothesis for the location of the wireless terminal at time t(1);
  generating, at the location engine, a first hypothesis for the location for the wireless terminal at time t(2) based on the third signal value; and
  generating, at the location engine, an estimate for the location of the wireless terminal at time t(2) based on:
    (i) a measure of distance between the second hypothesis for the location for the wireless terminal at time t(1) and the first hypothesis for the location for the wireless terminal at time t(2); and transmitting, from the location engine, the estimate for the location of the wireless terminal at time t(2) for use by a location-based application;
wherein the first weight and the second weight are both real non-negative numbers.

10. The method of claim 9 further comprising:
generating, at the location engine, a third hypothesis for the location for the wireless terminal at time t(1) based on the first signal value having a third weight and the second signal value having a fourth weight, wherein the third weight equals the fourth weight; and
wherein the estimate for the location of the wireless terminal at time t(2) is also based on:
  (ii) the third hypothesis for the location for the wireless terminal at time t(1).

11. The method of claim 10 wherein the estimate for the location of the wireless terminal at time t(2) is also based on:
  (iii) a measure of distance between the second hypothesis for the location for the wireless terminal at time t(1) and the third hypothesis for the location for the wireless terminal at time t(1).

12. The method of claim 9 wherein time t(1) occurs before time t(2).

13. The method of claim 9 wherein time t(2) occurs before time t(1).

14. The method of claim 9 wherein the measure of distance is the road travel time.

15. The method of claim 9 wherein the measure of distance is the Euclidean distance.

16. The method of claim 9 wherein second hypothesis for the location of the wireless terminal at time t(1) is a location on a road that is the shortest Euclidean distance between the first hypothesis for the location of the wireless terminal at time t(1) and any point on any road.

17. A method of estimating the location of a wireless terminal, the method comprising:
  receiving, at a location engine, a first signal value whose value is evidence of the location of the wireless terminal at time t(1);
  receiving, at the location engine, a second signal value whose value is evidence of the location of the wireless terminal at time t(1);
  receiving, at the location engine, a third signal value whose value is evidence of the location of the wireless terminal at time t(2);
  generating, at the location engine, a first hypothesis for the location for the wireless terminal at time t(1) based on the first signal value having first weight and the second signal value having second weight, wherein the first weight is greater than the second weight;
  generating, at the location engine, a second hypothesis for the location for the wireless terminal at time t(1) based on the nearness of a location on a road in relation to the first hypothesis for the location of the wireless terminal at time t(1);
  generating, at the location engine, a third hypothesis for the location for the wireless terminal at time t(1) based on the first signal value having a third weight and the second signal value having a fourth weight, wherein the third weight equals the fourth weight;
  generating, at the location engine, a first hypothesis for the location for the wireless terminal at time t(2) based on the third signal value; and
  generating, at the location engine, an estimate for the location of the wireless terminal at time t(2) based on:
    (i) a measure of distance between the second hypothesis for the location for the wireless terminal at time t(1)

and the third hypothesis for the location for the wireless terminal at time t(1), and
(ii) the first hypothesis for the location for the wireless terminal at time t(2); and
transmitting, from the location engine, the estimate for the location of the wireless terminal at time t(2) for use by a location-based application;
wherein the first weight, the second weight, the third weight, and the fourth weight are all real non-negative numbers.

18. The method of claim 17 wherein time t(1) occurs before time t(2).

19. The method of claim 17 wherein time t(2) occurs before time t(1).

20. The method of claim 17 wherein the measure of distance is the road travel time.

21. The method of claim 17 wherein the second hypothesis for the location of the wireless terminal at time t(1) is a location on a road that is the shortest Euclidean distance between the first hypothesis for the location of the wireless terminal at time t(1) and any point on any road.

22. A location engine for estimating the location of a wireless terminal, the location engine comprising:
a receiver for receiving:
(i) a first signal value whose value is evidence of the location of the wireless terminal at time t(1); and
(ii) a second signal value whose value is evidence of the location of the wireless terminal at time t(1);
a processor for:
(i) generating a first hypothesis for the location for the wireless terminal at time t(1) based on the first signal value having first weight and the second signal value having second weight, wherein the first weight is greater than the second weight;
(ii) generating a second hypothesis for the location for the wireless terminal at time t(1) based on the nearness of a location on a road in relation to the first hypothesis for the location of the wireless terminal at time t(1); and
(iv) generating an estimate for the location of the wireless terminal at time t(2) based on:
(1) the second hypothesis for the location for the wireless terminal at time t(1); and
a transmitter for transmitting the estimate for the location of the wireless terminal at time t(2) for use by a location-based application; wherein the first weight and the second weight are both real non-negative numbers.

23. The location engine of claim 22 wherein the processor is also for:
generating a third hypothesis for the location for the wireless terminal at time t(1) based on the first signal value having a third weight and the second signal value having a fourth weight, wherein the third weight equals the fourth weight; and
wherein the estimate for the location of the wireless terminal at time t(2) is also based on:
(ii) the third hypothesis for the location for the wireless terminal at time t(1).

24. The location engine of claim 23 wherein the estimate for the location of the wireless terminal at time t(2) is also based on:
(iii) a measure of distance between the second hypothesis for the location for the wireless terminal at time t(1) and the third hypothesis for the location for the wireless terminal at time t(1).

25. The location engine of claim 22 wherein time t(1) occurs before time t(2).

26. The location engine of claim 22 wherein time t(2) occurs before time t(1).

27. The location engine of claim 22, wherein the receiver is also for receiving a third signal value whose value is evidence of the location of the wireless terminal at time t(2);
wherein the processor is also for generating a first hypothesis for the location for the wireless terminal at time t(2) based on the third signal value; and
wherein the estimate for the location of the wireless terminal at time t(2) is also based on:
(2) a measure of distance between the first hypothesis for the location for the wireless terminal at time t(1) and the first hypothesis for the location for the wireless terminal at time t(2).

28. The location engine of claim 27 wherein the measure of distance is the road travel time.

29. The location engine of claim 27 wherein the second hypothesis for the location of the wireless terminal at time t(1) is a location on a road that is the shortest Euclidean distance between the first hypothesis for the location of the wireless terminal at time t(1) and any point on any road.

30. A location engine for estimating the location of a wireless terminal, the location engine comprising:
a receiver for receiving:
(i) a first signal value whose value is evidence of the location of the wireless terminal at time t(1);
(ii) a second signal value whose value is evidence of the location of the wireless terminal at time t(1); and
(iii) a third signal value whose value is evidence of the location of the wireless terminal at time t(2);
a processor for generating:
(i) a first hypothesis for the location for the wireless terminal at time t(1) based on the first signal value having first weight and the second signal value having second weight, wherein the first weight is greater than the second weight;
(ii) a second hypothesis for the location for the wireless terminal at time t(1) based on the nearness of a location on a road in relation to the first hypothesis for the location of the wireless terminal at time t(1);
(iii) a first hypothesis for the location for the wireless terminal at time t(2) based on the third signal value; and
(iv) an estimate for the location of the wireless terminal at time t(2) based on:
(1) a measure of distance between the second hypothesis for the location for the wireless terminal at time t(1) and the first hypothesis for the location for the wireless terminal at time t(2); and
a transmitter for transmitting the estimate for the location of the wireless terminal at time t(2) for use by a location-based application;
wherein the first weight and the second weight are both real non-negative numbers.

31. The location engine of claim 30 wherein the processor is also for:
generating a third hypothesis for the location for the wireless terminal at time t(1) based on the first signal value having a third weight and the second signal value having a fourth weight, wherein the third weight equals the fourth weight; and
wherein the estimate for the location of the wireless terminal at time t(2) is also based on:
(ii) the third hypothesis for the location for the wireless terminal at time t(1).

32. The location engine of claim 31 wherein the estimate for the location of the wireless terminal at time t(2) is also based on:
- (iii) a measure of distance between the second hypothesis for the location for the wireless terminal at time t(1) and the third hypothesis for the location for the wireless terminal at time t(1).

33. The location engine of claim 30 wherein time t(1) occurs before time t(2).

34. The location engine of claim 30 wherein time t(2) occurs before time t(1).

35. The location engine of claim 30 wherein the measure of distance is the road travel time.

36. The location engine of claim 30 wherein the measure of distance is the Euclidean distance.

37. The location engine of claim 30 wherein the second hypothesis for the location of the wireless terminal at time t(1) is a location on a road that is the shortest Euclidean distance between the first hypothesis for the location of the wireless terminal at time t(1) and any point on any road.

38. A location engine for estimating the location of a wireless terminal, the location engine comprising:
- a receiver for receiving:
  - (i) a first signal value whose value is evidence of the location of the wireless terminal at time t(1);
  - (ii) a second signal value whose value is evidence of the location of the wireless terminal at time t(1);
  - (iii) a third signal value whose value is evidence of the location of the wireless terminal at time t(2);
- a processor for generating:
  - (i) a first hypothesis for the location for the wireless terminal at time t(1) based on the first signal value having first weight and the second signal value having second weight, wherein the first weight is greater than the second weight;
  - (ii) a second hypothesis for the location for the wireless terminal at time t(1) based on the nearness of a location on a road in relation to the first hypothesis for the location of the wireless terminal at time t(1);
  - (iii) a third hypothesis for the location for the wireless terminal at time t(1) based on the first signal value having a third weight and the second signal value having a fourth weight, wherein the third weight equals the fourth weight;
  - (iv) a first hypothesis for the location for the wireless terminal at time t(2) based on the third signal value; and
  - (v) an estimate for the location of the wireless terminal at time t(2) based on:
    - (1) a measure of distance between the second hypothesis for the location for the wireless terminal at time t(1) and the third hypothesis for the location for the wireless terminal at time t(1) and
    - (2) the first hypothesis for the location for the wireless terminal at time t(2); and
- transmitting, from the location engine, the estimate for the location of the wireless terminal at time t(2) for use by a location-based application;
- wherein the first weight, the second weight, the third weight, and the fourth weight are all real non-negative numbers.

39. The location engine of claim 38 wherein time t(1) occurs before time t(2).

40. The location engine of claim 38 wherein time t(2) occurs before time t(1).

41. The location engine of claim 38 wherein the measure of distance is the road travel time.

42. The location engine of claim 38 wherein the second hypothesis for the location of the wireless terminal at time t(1) is a location on a road that is the shortest Euclidean distance between the first hypothesis for the location of the wireless terminal at time t(1) and any point on any road.

* * * * *